July 29, 1947.  N. S. ELLIS  2,424,747
SCOURING DEVICE
Filed Jan. 9, 1945  2 Sheets-Sheet 1

INVENTOR.
Norman Stanley Ellis,
BY George D. Richards,
Attorney

July 29, 1947.  N. S. ELLIS  2,424,747
SCOURING DEVICE
Filed Jan. 9, 1945  2 Sheets-Sheet 2

INVENTOR.
Norman Stanley Ellis
BY George D. Richards
Attorney

Patented July 29, 1947

2,424,747

UNITED STATES PATENT OFFICE 2,424,747

SCOURING DEVICE

Norman Stanley Ellis, Hamilton, Ontario, Canada, assignor to Metal Textile Corporation, West Orange, N. J., a corporation of Delaware Application January 9, 1945, Serial No. 572,014

2 Claims. (Cl. 15—209)

This invention relates to improvements in scouring devices of the general kind disclosed in prior United States Letters Patent Nos. 1,683,357 and 1,689,207; and this invention has reference, more particularly, to an improved method and means for closing and securing an open end of the cover section of a scouring device of such kind.

This invention has for an object to provide a novel method and means for gathering together and closing an open end portion of the cover section of a knitted metallic mesh scouring body, and then securing said gathered end portion in such closed condition by spot soldering or welding the folds thereof in non-releaseably fastened together relation.

This invention has for another object to provide a novel folded formation of an open end portion of the cover section of a knitted metallic mesh scouring body of ball-like form, whereby a plurality of gathered together and lapped fold sections are superposed at an end of the ball-like body to project therefrom subject to spot soldering or welding the same in securely fastened together relation, whereafter the thus assembled and secured together folds are turned or pressed down to lie substantially in the plane of the external surface of the said ball-like body.

Other objects of this invention, not at this time more particularly enumerated, will be understood from the following detailed description of the same.

An illustrative embodiment of the invention is shown in the accompanying drawings, in which—

Figure 6:
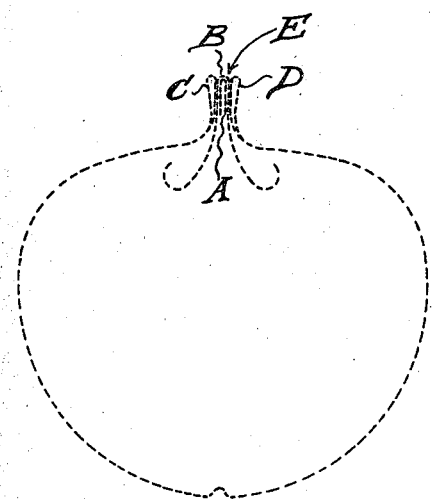
Figure 7:
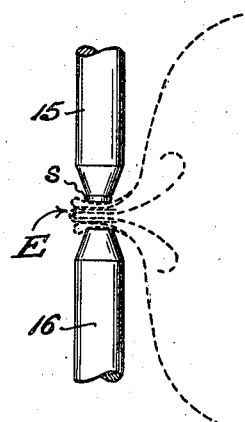
Figure 8:
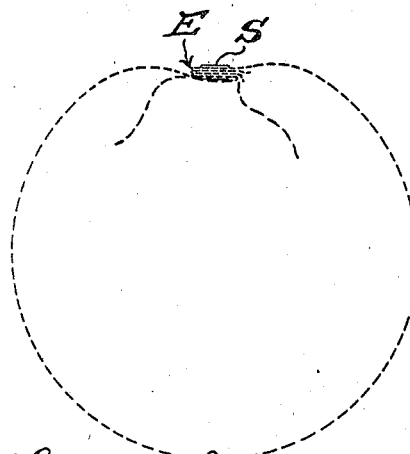

Fig. 6 is a schematic side elevational view showing the gathered together closure folds of the cover section; and Fig. 7 is a fragmentary side elevational view showing the gathered together closure folds as subjected to the spot soldering or welding operation; and Fig. 8 is a side elevational view showing the spot soldered or welded closure folds turned or pressed down to lie substantially in the plane of the external surface of the ball-like body of the scouring device.

Similar characters of reference are employed in the above described views, to indicate corresponding parts.

The scouring device to which this invention relates is made from a tubular knit metallic fabric, preferably knitted from ribbon-like or flat wire of a selected metal, such as copper, steel or other ferrous metal, Monel, or other metal.

Figure 2:
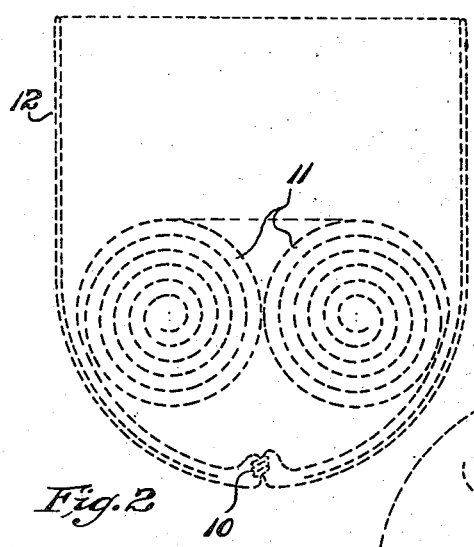
Fig. 2 is a schematic sectional view of the scouring body showing its core section partially enclosed by a cover section, an end of said cover section being shown in open condition ready for closing.

The scouring device comprises a resilient body of substantially ball-like shape. The body, in one embodiment thereof, is made from a length of tubular knit metallic mesh twisted or otherwise gathered and secured at a point intermediate its ends to provide a fixed restricted portion 10 (see Fig. 2) which divides the same into two sections, one section being suitably rolled or folded upon itself, or otherwise balled, to provide a central core 11, and the other section being turned over and exteriorly about said core to form a cover section 12 having a projecting open end (see Fig. 2). To complete the device, the open free end of the cover section 12 must be gathered together and secured to close the same over the underlying core 11. This type of scouring device being disclosed in United States Letters Patent 1,683,357.

In a type of the scouring device, as disclosed by United States Letters Patent 1,689,207, the core may be a mass of metallic material separate from the cover section, said cover section being made of tubular knit metallic mesh within which the core mass is inserted, after which the respective open ends of the cover section must be gathered together and secured to close the ends of the same over the underlying core.

As above stated, the instant invention relates to a novel method of gathering and securing in closed condition an initially open end of a cover section as applied to either of the above referred to types of scouring devices, or to other types of scouring devices of similar kind; whereby a novel fastening means is provided for retaining the cover section against displacement from a central core enveloped thereby.

Figure 3:
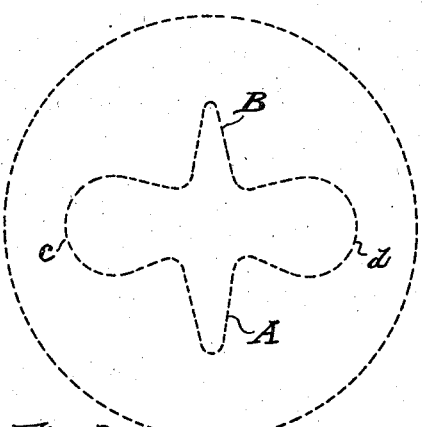
Figs. 3, 4 and 5 are schematic end elevational views showing various stages in the manipulation of the open end of the cover section whereby to form and gather together closure folds thereof preparatory to spot soldering or welding the same in securely fastened together relation.
Figure 4:
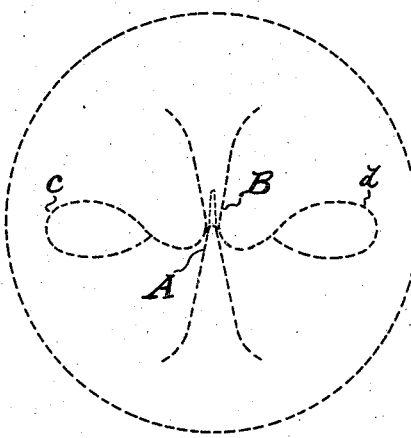
Figure 5:
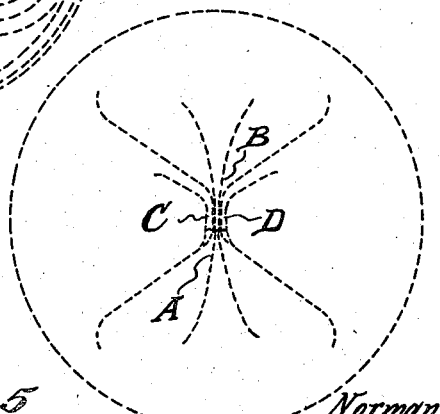

To effect the novel cover section closure according to this invention, the walls of the open end of the cover section, as e. g. the cover section 12, are pinched together at diametrically opposite points to thereby form the marginal portions thereof into diametrically aligned and opposed primary folds A and B (see Fig. 3). These folds A and B are then moved one toward the other so that their open ends are opposed in radial plane and suitably lapped. By a preferred method of lapping said primary folds, one such fold, as e. g. the fold A, is telescoped endwise into the other, as e. g. the fold B (see Fig. 4), and then the telescoped portions thereof are pressed and flattened together so that their side walls become contiguous. In thus forming and manipulating the folds A and B, opposed right angularly extending partial fold $c$ and $d$ (see Fig. 4) are produced. These partial folds $c$ and $d$ are thereupon respectively pinched together to form completed secondary folds C and D, the free end portions of which are turned to parallel the telescoped folds A and B, and so as to respectively lie contiguous to opposite sides of the latter (see Fig. 5).

By thus manipulating the cover section material to form the described folds and thereupon bring their free end parts together in contiguous parallel relation, the open end of the cover section is gathered and closed over the underlying core 11. The assembled folds A, B, C and D, when produced as described, initially project radially from the scouring device body, and together provide a closure portion E (see Fig. 6).

Figure 1:
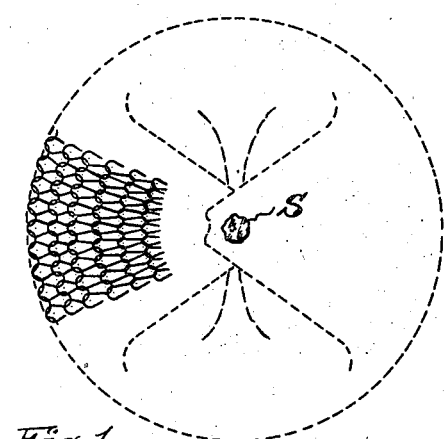
Fig. 1 is an end elevational view of a knitted metallic mesh scouring body of ball-like form having a cover section closed by the novel fold formation secured by a spot solder or weld spot according to this invention.

The closure portion E having been thus produced, the same is subjected to a spot soldering or welding operation, whereby the contiguous component fold end parts are firmly and strongly fastened together against separation. This may be done in any suitable manner by the aid of any suitable means, but illustratively and preferably is accomplished by inserting the closure portion E between spot soldering or welding elements or points 15 and 16, one or both of which are heated either electrically or otherwise. If the metallic character of the mesh material of which the device is made is suitable for the effect, the fastening may comprise a spot weld formed from the metallic material of the contiguous component fold end parts. On the other hand, with some metallic materials, such e. g. as copper, it is preferable to apply solder $s$ to the closure portion E, and by fusing the same between the elements or points 15 and 16, thereby form a solder spot adapted to penetrate the contiguous component fold end parts so as to strongly unite the same. In either case, a fastener spot S of fused metal is formed (see Figs. 1 and 8), whereby the gathered and closed open end portion of the cover section 12 is strongly secured against displacement from its enveloping relation to the contained core section 11.

After the closure portion E is secured against disintegration the same is upset and crushed or flattened down so as to lie substantially in the plane of the external surface of the ball-like body of the completed scouring device (see Fig. 8).

From the above it will be understood that a scouring body having an enveloping cover section is provided wherein an open end of said cover section is closed and then secured by a single incorporated fused metal fastener spot of small mass unitary with the cover section material, and which possesses no sharp points or projections, such as usually accompany wire stitching or stapling heretofore most generally used as the fastening means.

Having now described my invention, I claim:

1. In a scouring body of the kind described having a tubular knit cover section of metallic mesh, means to close an open end of said cover section comprising opposed diametrically aligned primary folds formed in the cover section walls to project radially from the scouring body, said primary folds each comprising cover section wall portions doubled upon themselves, said primary folds having their end parts telescoped together whereby doubled together wall portions of one are entered between the doubled together wall portions of the other, said thus telescoped wall portions of the primary folds being flattened into contiguous relation, similarly formed radial and opposed diametrically aligned secondary folds right angular to said primary fold formation, end parts of said secondary folds being turned to lie parallel and flatly contiguous to said primary fold formation respectively at opposite sides of the latter, and means to fixedly secure the thus related primary and secondary folds against separation.

2. In a scouring body of the kind described having a tubular knit cover section of metallic mesh, means to close an open end of said cover section comprising opposed diametrically aligned primary folds formed in the cover section walls to project radially from the scouring body, said primary folds each comprising cover section wall portions doubled upon themselves, said primary folds having their end parts telescoped together whereby doubled together wall portions of one are entered between the doubled together wall portions of the other, said thus telescoped wall portions of the primary folds being flattened into contiguous relation, similarly formed radial and opposed diametrically aligned secondary folds right angular to said primary fold formation, end parts of said secondary folds being turned to lie parallel and flatly contiguous to said primary fold formation respectively at opposite sides of the latter, and means to fixedly secure the thus related primary and secondary folds against separation, said means comprising a button-like mass of fused metal permeating the plies of said primary and secondary folds.

NORMAN STANLEY ELLIS.

REFERENCES CITED

The following references are of record in the file of this patent:

UNITED STATES PATENTS

| Number | Name | Date |
| --- | --- | --- |
| 2,262,455 | Goodloe | Nov. 11, 1941 |
| 1,498,385 | Kingman | June 17, 1924 |
| 1,683,357 | Kingman | Sept. 4, 1928 |
| 1,689,207 | Kingman | Oct. 30, 1928 |
| 2,350,357 | Kelman | June 6, 1944 |
| 2,043,031 | Bradford | June 2, 1936 |
| 1,697,499 | Field | Jan. 1, 1929 |

FOREIGN PATENTS

| Number | Country | Date |
| --- | --- | --- |
| 398,337 | Great Britain | Sept. 14, 1933 |